(12) United States Patent
Markley et al.

(10) Patent No.: US 6,322,470 B1
(45) Date of Patent: Nov. 27, 2001

(54) PIVOTING DUAL ARM CHAIN TENSIONER SYSTEM FOR CONTACTING MULTIPLE CHAIN STRANDS

(75) Inventors: George L. Markley, Montour Falls; Mark M. Wigsten, Lansing, both of NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/572,739

(22) Filed: May 17, 2000

(51) Int. Cl.$^7$ .................................................. F16H 7/08
(52) U.S. Cl. ............................................. 474/111; 474/122
(58) Field of Search ..................................... 474/110, 111, 474/112, 119, 122, 128, 129, 101; 123/90.15

(56) References Cited

U.S. PATENT DOCUMENTS

| | | | |
|---|---|---|---|
| 2,129,107 | * 9/1938 | Taylor | 474/111 X |
| 2,210,276 | * 8/1940 | Bremer | 474/111 X |
| 3,490,302 | 1/1970 | Turner et al. | |
| 3,964,331 | 6/1976 | Oldfield | |
| 5,246,404 | * 9/1993 | Ojima | 474/111 |
| 5,318,482 | 6/1994 | Sato et al. | 474/111 |
| 5,597,367 | 1/1997 | Trzmiel et al. | 474/110 |
| 5,797,817 | 8/1998 | Senftleben et al. | 474/110 |
| 5,989,139 | 11/1999 | Dusinberre, II et al. | 474/110 |

FOREIGN PATENT DOCUMENTS 861741  2/1961  (GB) .

* cited by examiner

*Primary Examiner*—Mary Ann Green
(74) *Attorney, Agent, or Firm*—Sidley Austin Brown & Wood; Greg Dziegielewski

(57) ABSTRACT

An engine tensioning system including a pair of pivoting arms used to simultaneously tension two separate strands of the same chain in an engine timing system. The tensioner system includes a lever. The lever has a pair of fixed pins attached to an end located between the two strands of chain. The arms extend outside separate strands of the chain and carry shoes positioned to contact an outside portion of the chain are pivotally mounted to the fixed pins. Rotation of the lever causes the fixed pins to move laterally with respect to the chain strands and cause the arms to draw inwardly. The inward movement of the arms draw the shoes into contact with the chain strands and impart tension to the separate strands of the chain simultaneously.

7 Claims, 2 Drawing Sheets

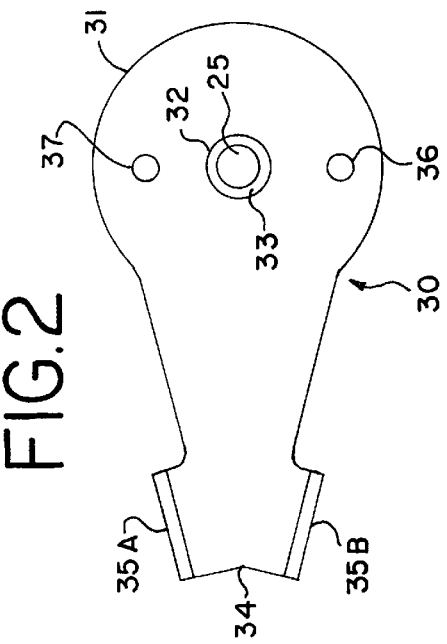
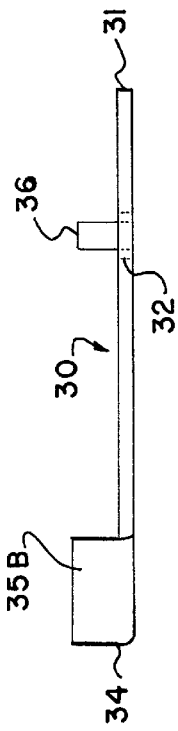
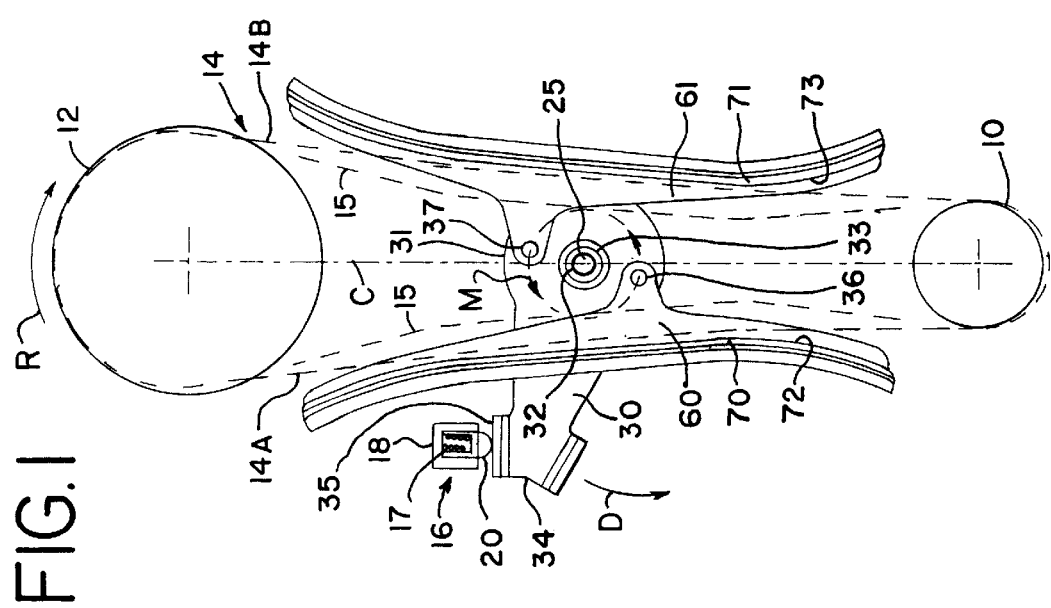

PIVOTING DUAL ARM CHAIN TENSIONER SYSTEM FOR CONTACTING MULTIPLE CHAIN STRANDS

BACKGROUND OF THE INVENTION

The present invention relates generally to tensioners used with chain drives in automotive timing and power transmission applications. In particular, the present invention is related to a chain tensioner system having a pair of arms. The arms are positioned outside opposite strands of chain in a power transmission system. The tensioner system causes the arms to travel inwardly towards a chain centerline which acts to simultaneously tension the two strands of a chain in an engine timing application.

Chain tensioning devices, such as hydraulic tensioners, are used as control devices for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or unmeshing of the chain with the sprocket teeth. It is especially important in the case of a chain-driven camshaft in an internal combustion engine to prevent the chain from slipping because the camshaft timing can be misaligned by several degrees, possibly rendering the engine inoperative or causing damage.

A hydraulic tensioner as used with a tensioner arm or shoe is shown in Simpson et al., U.S. Pat. No. 5,967,921, which is incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) into the housing, typically a check valve is provided to restrict the flow of fluid from the chamber. In such a fashion, the tensioner achieves a so-called no-return function, i.e., movements of the plunger are easy in one direction (outward) but difficult in the reverse direction. In addition, rack and ratchet mechanisms, which are well known in the art are employed to provide a mechanical no-return function.

One example of a chain tensioner which uses a hydraulic tensioner and a pivoted lever to tension a chain is described in Sato et al., U.S. Pat. No. 5,318,482. Sato et al. show a conventional hydraulic tensioner with a plunger pressing a pivoted lever against a chain to impart an appropriate tension to the chain. The tensioner and single shoe arm of Sato et al. has limitations, however, in the amount of chain slack it can take up during the life of the chain. In addition, the single shoe arm of Sato et al. has limitations in its ability to absorb and damp cyclic vibrations in the chain during operation.

Conventional prior art tensioners which tension only one strand of chain, i.e., a single length of chain between two sprockets, in an engine timing application with long center distances between the sprockets have a common weakness. During operation of the engine, wear on the various chain parts causes the chain to lengthen. Taking up the resulting slack on one side of an engine timing system and not the other can cause the timing of the camshaft to change relative to the crankshaft. In some engine timing chain applications, the large center distances cause both sides of the chain span between sprockets to slacken as the chain wears and extends in length.

To address the above problems the present invention includes an actuator, in the form of a conventional hydraulic tensioner in combination with a pivoting lever. The lever has a pair of fixed pins on opposite sides of a central pivot bore. The fixed pins each carry an arm with each arm carrying an attached shoe. In combination, the shoes contact and act on separate strands of a common chain. This provides potentially double the operating take-up for a given range of tensioner operation as compared to a conventional hydraulic tensioner acting upon a single arm with an end pivot that acts on one chain strand.

When the present invention is used to tension separate strands of a single chain, vibrations which occur in one strand of chain tend to be cancelled when the energy of those vibrations are transferred to or combined with those in another strand through the pivoting tensioner. Further, when taking up chain slack in an engine timing application, the present invention minimizes the chance for changes in the timing between the crankshaft and the camshaft as the chain wears and slackens on both sides of the chain span between the sprockets.

SUMMARY OF THE INVENTION

The present invention provides a chain tensioner system which includes an actuator which may be a conventional hydraulic tensioner, in conjunction with a pivoting lever. The lever carries a pair of pivoting arms. The arms extend outside of and contact both lengths or strands of the span of chain between a pair of sprockets. Actuation of the tensioner against the lever causes rotation of the lever which causes inward motion of the arms. The inward motion of the arms causes tension to be imparted to both strands of the chain simultaneously.

One example of the chain tensioner system of the present invention includes a hydraulic actuator as described above and a pivoting lever. Alternately, the actuator may be a mechanical tensioner or any suitable mechanism which is capable of providing sufficient force and travel to act on the lever to provide an adjustment in tension of the chain. The chain has two opposite strands, spans or lengths that are the portions extending between the sprockets. The strand between the sprockets where the chain leaves a driven sprocket and enters a driving sprocket is typically the tight strand or side and the strand between the sprockets where the chain leaves the driving sprocket and enters the driven sprocket is typically the slack strand or side of the chain. However, in systems with large center distances, both sides of the chain evidence some slack.

The lever includes a first end which is located between the chain strands. In the center of the first end of the lever is a pivot bore. The pivot bore is a hole with a cylindrical sleeve or bushing through which a pivot pin, shaft or bolt is inserted and about which the lever may rotate. The pivot pin is attached to an engine block or a mounting surface. The pivot bore and pivot pin are centered on a centerline extending between the two sprockets.

A pair of fixed pins are attached near the periphery of the first end of the lever. The fixed pins are located in near alignment with the chain centerline and equally spaced apart on opposite sides of the pivot bore. A pair of arms, each with an attached plastic shoe, are mounted to and allowed to rotate on each of the fixed pins. The arms extend outside the strands of the chain such that the shoes are positioned to contact an outside portion of the chain. A first arm and associated shoe extend outside the slack strand and a second arm and shoe extend outside the tight strand of chain.

A first fixed pin which is mounted to the lever in a position generally below the pivot bore carries the first arm. The first arm extends outside the slack strand of the chain (assuming a pair of sprockets with a wrapped chain traveling in a clockwise direction). A second fixed pin which is mounted to the lever in a position generally above the pivot bore carries the second arm. The second arm extends outside of the tight strand of the chain.

A second end of the lever extends a distance from the first end of the lever and extends outside the loop of the chain. The second end of the lever has at least one contact surface. It should be understood that the second end of the lever may be located in a number of equivalent positions.

In operation, actuation of the tensioner directs a force to the second end of the lever which causes rotation of the lever about the pivot pin. The fixed pins mounted on the first end of the lever pull the mounted arms in toward the chain centerline. For example, when the lever rotates in a counterclockwise direction, the first fixed pin and first arm are moved in a direction toward the chain centerline. Since the first arm is located outside the slack strand of the chain the inward travel of the first arm imparts an increased tension to the slack strand by displacing the slack chain strand path toward the chain centerline. Simultaneously, the second fixed pin and second arm are moved in a direction toward the chain centerline. Since the second arm is located outside the tight strand of the chain, the inward travel of the second arm imparts an increased tension to the tight strand by displacing the tight chain strand path toward the chain centerline.

Pivoting the lever about the pivot bore by applying a force to the contact surface causes the fixed pins to draw the arms and shoes inwardly into contact with the chain strands thereby causing the chain to be squeezed inwardly toward the centerline and tensioned on both tight and slack strands simultaneously.

In a second embodiment of the present invention, the pins mounted upon the lever are located different distances from the center of the pivot bore. In this manner, the fixed pin which is located closer to the center of the bore (the center of rotation) produces less take-up motion in the attached arm. This feature would be useful in the situation where less take-up is desired in the tight strand compared to the slack strand of a chain.

For a further understanding of the present invention and the objects thereof, attention is directed to the drawing and the following brief description thereof, to the detailed description of the preferred embodiment of the invention and to the appended claims.

BRIEF DESCRIPTION OF THE DRAWINGS

FIG. 1 is a front view of the present invention.

FIG. 2 is a front view of the lever of the present invention.

FIG. 3 is a bottom view of the lever of FIG. 2.

DETAILED DESCRIPTION OF THE PREFERRED EMBODIMENTS

Figure 4:
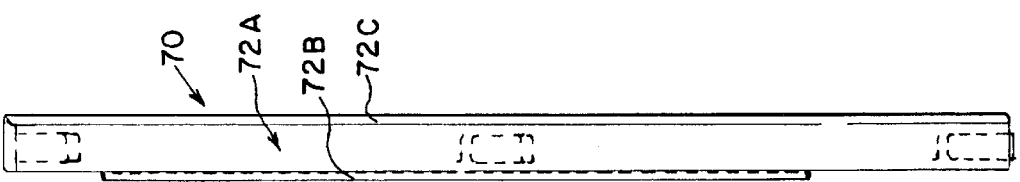
FIG. 4 is a front view of the arm of the present invention.

Turning now to the drawings, FIG. 1 shows a front view of a preferred embodiment of the present invention. In this figure, an engine timing system is represented generally by crankshaft sprocket 10 (the drive sprocket) and camshaft sprocket 12 (the driven sprocket). The path of a power transmission chain, i.e., a silent chain, roller chain or the like, is represented by broken chain line 14 wrapped around the drive sprocket 10 and the driven sprocket 12. The path of a power transmission chain which has elongated due to wear is represented by broken chain line 15. The tensioner system of the present invention is located between the tight and loose strands of the chain and between the two sprockets.

The tensioner system includes an actuator 16 which may be a hydraulic tensioner or the like. In the present illustration, the actuator 16 is represented by housing 18 and plunger 20. The plunger is biased in an outward direction from the housing by spring 17. The housing 18 is mounted to a fixed mount or engine block (not shown). The plunger extends outwardly from the housing.

The tensioner system includes a pivoting lever 30 which carries a pair of arms 60, 61 with attached shoes 70, 71. The lever 30 has a first end 31 with a generally circular shape positioned between the opposite strands of the chain 14 and centered with respect to a centerline C extending between the center of the drive 10 and the driven sprocket 12. The center of the first end 31 of the lever 30 has a pivot bore 32 formed therein. The pivot bore 32 is provided with a bushing 33. The pivot bore 32 and bushing 33 are centered with respect to the centerline C. The first end 31 receives a fixed pivot pin 25 in the pivot bore 32 which allows the lever 30 to pivot about the pivot pin 25. The pivot pin 25 may be fixed to a mounting surface or an engine block (not shown).

A second end 34 of the lever 30 extends to the outside of the chain 14. The second end 34 has a contact surface 35 extending generally perpendicular to the lever 30. The plunger 20 of the actuator 16 is positioned to act against the contact surface 35. A combination of spring and fluid pressure causes the plunger 20 to extend from the housing 18 and causes the lever 30 to rotate about the pivot pin 25, as shown in this illustration, in a counterclockwise direction D.

A pair of fixed pins 36, 37 are attached to the lever 30 near the periphery of the circular first end 31 on opposite sides with respect to the pivot bore 32. A first fixed pin 36 is located below the pivot bore 32 and slightly to the left of the centerline C near the slack chain strand. A second fixed pin 37 is located above the pivot bore 32 and slightly to the right of the centerline C. The first and second pins are located equidistant from the center of the pivot bore. In this arrangement, movement of the lever 30 about the pivot pin 25 causes the fixed pins 36, 37 to move equally in a lateral direction, indicated in the direction M, substantially perpendicular with respect to the centerline C.

A first arm 60 is rotatably attached to the first fixed pin 36. The first arm 60 extends outside the slack strand 14A of the chain 14 and carries a shoe 70 with a wear face 72 positioned to contact the outside portion of the chain strand 14A. A second arm 61 is rotatably attached to the second fixed pin 37. The second arm 61 extends outside the tight strand 14B of the chain 14 and carries a shoe 71 with a wear face 73 positioned to contact the outside portion of the chain strand 14B.

In operation, the plunger 20 moves the second end 34 of the lever 30 (in direction D) about the pivot pin 25 causing a counterclockwise movement of the first end 31 of the lever 30. In this manner, the fixed pins 36, 37 pull the arms 60, 61 and attached shoes 70, 71 laterally toward the chain centerline C and into contact with outside portions of the chain strands 14A, 14B. As the arms are pulled by the fixed pins into a position closer to the chain centerline C, the chain is essentially squeezed or tightened from both sides or along both spans, simultaneously and tension is imparted to the chain strands accordingly.

In this manner, the tensioner system of the present invention will potentially produce approximately double the take-up for a given range of tensioner operation as compared to a conventional hydraulic tensioner acting upon a single arm with an end pivot that acts on one chain strand. Additionally, vibration in a first strand of chain, whether it be the loose or tight strand is transferred and damped by action of the second strand of chain due to the coupling of the two arms through the lever.

FIG. 2 depicts the lever 30 of FIG. 1 in a front view. The first end 31 has a generally circular shape with a pivot bore 32 in the center. It should be understood that the first end of the lever may be a number of shapes. The pivot bore 32 has a bushing 33 disposed therein. Spaced equally apart and on opposite sides of the pivot bore near the periphery of the circular first end 31 are a first fixed pin 36 and a second fixed pin 37. The lever 30 has a second end 34 with first contact surface 35A and second contact surface 35B, formed perpendicular to the lever, which enable the lever to be assembled into the tensioner system in a right facing or left facing orientation. In other words, the lever 30 may be used in a tensioner system with the second end 34 extending outside of either side of the chain and sprocket system. Alternately, the lever may be oriented along the chain centerline in a chain and sprocket system where the center-to-center distance between sprockets provides sufficient space for the lever.

FIG. 3 depicts a bottom view of the lever of FIG. 2. In particular, the contact surface 35B is a rectangular tab oriented perpendicular to the main body portion of the lever 30 at the second end 34 of the lever. The first fixed pin 36 is shown in alignment with the pivot bore 32 near the first end 31 of the lever 30.

FIG. 4 depicts an arm 60 in a front view. The first and second arms (60, 61 as shown in FIG. 1) are identical in structure but oriented to operate on a strand of chain depending on the direction of chain travel. The arm 60 has an elongated bracket portion 60A with a bore 80. The bore 80 is slightly offset toward the leading end of the bracket portion 60A of the arm 60. More particularly, the bore 80 is offset toward the end of the arm 60 nearest the incoming chain.

Figure 5:
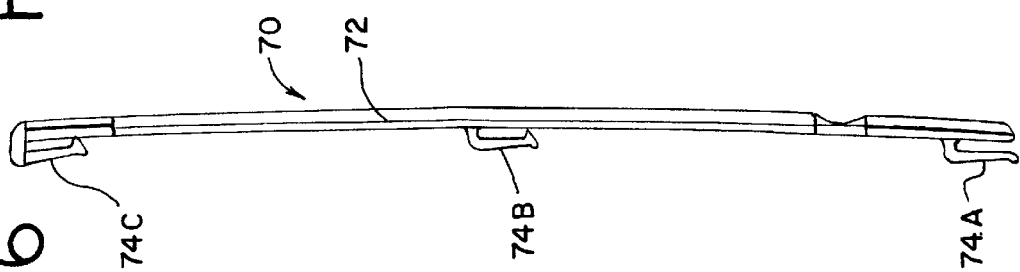
FIG. 5 is a side view of the arm of FIG. 4.

The arm has a shoe attachment portion 60B, also shown in FIG. 5, which is oriented perpendicular to the elongated bracket portion 60A. The face attachment portion 60B has a lengthwise gradual curve to generally match an associated span of chain and a plurality of rectangular openings 82A, 82B, 82C to facilitate the attachment of a plastic shoe.

Figure 6:
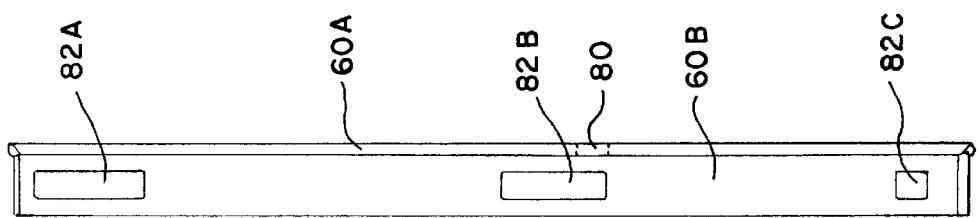
FIG. 6 is a front view of the shoe of the present invention.
Figure 7:
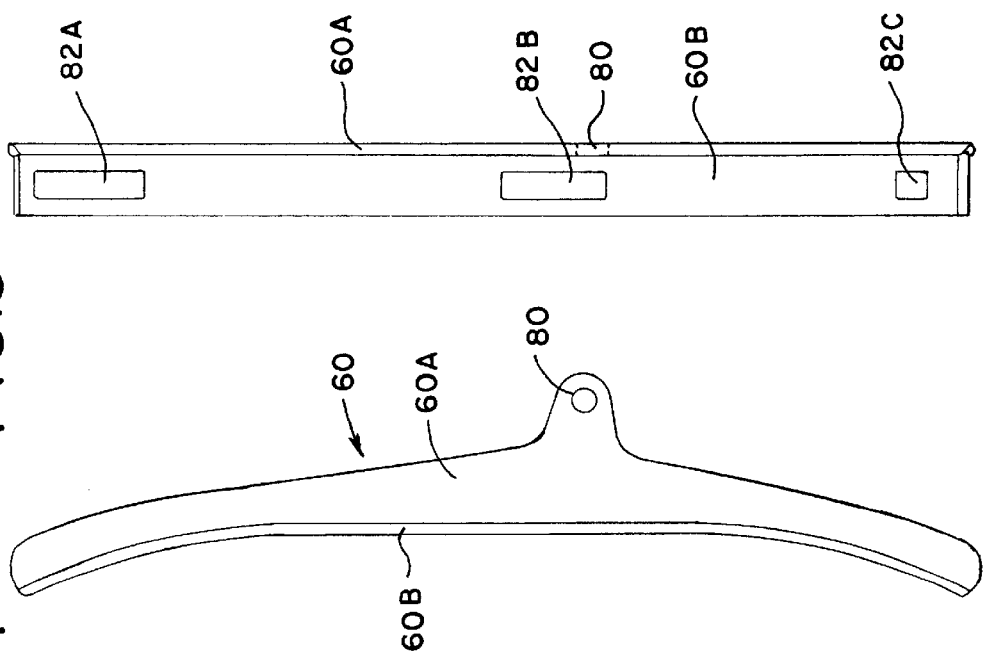
FIG. 7 is a side view of the shoe of FIG. 6.

The shoe portion 70 of the tensioner system is shown in FIGS. 6 and 7. The shoe includes a plurality of clips 74A, 74B, 74C formed on a back side of the shoe which insert through the rectangular openings in the shoe attachment portion of the arms. In particular, clip 74A engages hole 82A shown in FIG. 5. Similarly, clip 74B engages hole 82B and clip 74C engages hole 82C.

Preferably, a clip is formed at each end of the shoe and another clip is formed in an intermediate portion of the shoe.

Opposite the back side is a chain contacting wear face 72A, preferably with a flat central face and raised edges 72B, 72C to form a channel over which the chain travels.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A pivoting dual arm chain tensioner system for a power transmission chain wrapped around a plurality of rotating sprockets, said chain having a pair of strands extending between the sprockets, said tensioner system comprising:

a lever, said lever having a first end with a central pivot bore, said pivot bore being located between said pair of strands of said chain, said lever having a second end opposite said first end, said second end having a contact surface;

a first fixed pin and a second fixed pin, said first and second fixed pins being fixedly attached to said first end and spaced apart from each other;

a first arm disposed on said first fixed pin to permit rotation of said first arm with said first fixed pin about said central pivot bore, said first arm extending outside a first strand of said chain, said first strand being a slack strand, said first arm having a first shoe attached thereto for contacting said slack strand;

a second arm disposed on said second fixed pin to permit rotation of said second arm with said second fixed pin about said central pivot bore, said second arm extending outside a second strand of said chain, said second strand being a tight strand, said second arm having a second shoe attached thereto for contacting said tight strand;

an actuator positioned to contact said contact surface of said second end of said lever, said actuator acting upon said contact surface of said lever to cause said lever and said first and second fixed pins to rotate about said central pivot bore and to thereby cause movement of said first and second arms and said first and second shoes to impart tension to said chain strands.

2. The pivoting dual arm chain tensioner system of claim 1 wherein said first and second fixed pins are positioned on said first end of said lever to thereby cause movement of said first and second arms in a direction perpendicular with respect to a centerline drawn between said sprockets and through said central pivot bore to impart tension to said chain strands.

3. The pivoting dual arm chain tensioner system of claim 1 wherein said lever includes a first central axis extending from said first end to said second end and through said central pivot bore and dividing said lever into upper and lower portions, said first fixed pin is located below said central axis and said second fixed pin is located above said central axis.

4. The pivoting dual arm chain tensioner system of claim 3 wherein said first and second fixed pins are in substantial alignment with said pivot bore along a second axis that is generally perpendicular to said first central axis, said first and second fixed pins being equally spaced apart from said pivot bore along said second axis.

5. The pivoting dual arm chain tensioner system of claim 3 wherein said first fixed pin is spaced a first distance from said central axis and said second fixed pin is spaced a second distance from said central axis, said first distance being different from said second distance.

6. The pivoting dual arm chain tensioner system of claim 3 wherein said first arm is provided with a first tensioning force and said second arm is provided with a second tensioning force, said first force being greater than said second force.

7. The pivoting dual arm chain tensioner system of claim 1 wherein said first and said second arms are each pivoted about a single point, said pivoting movement of said arms permitting said arms to adjust to movement of said chain strands along said arms.

* * * * *